(12) United States Patent
Black

(10) Patent No.: US 9,305,383 B2
(45) Date of Patent: Apr. 5, 2016

(54) CHART LAYOUT WHICH HIGHLIGHTS EVENT OCCURRENCE PATTERNS

(71) Applicant: HONEYWELL INTERNATIONAL INC., Morristown, NJ (US)

(72) Inventor: Timothy Black, Edmonton (CA)

(73) Assignee: Honeywell International Inc., Morristown, NJ (US)

( * ) Notice: Subject to any disclaimer, the term of this patent is extended or adjusted under 35 U.S.C. 154(b) by 162 days.

(21) Appl. No.: 14/059,606

(22) Filed: Oct. 22, 2013

(65) Prior Publication Data

US 2015/0109305 A1    Apr. 23, 2015

(51) Int. Cl.
*G06T 11/20* (2006.01)
*G06Q 10/06* (2012.01)

(52) U.S. Cl.
CPC .............. *G06T 11/206* (2013.01); *G06Q 10/06* (2013.01)

(58) Field of Classification Search
None
See application file for complete search history.

(56) References Cited

U.S. PATENT DOCUMENTS

| | | | | |
|---|---|---|---|---|
| 4,597,045 | A * | 6/1986 | Kiuchi | 705/30 |
| 5,632,009 | A * | 5/1997 | Rao et al. | 715/201 |
| 7,646,294 | B2 | 1/2010 | Kow et al. | |
| 8,654,126 | B2 * | 2/2014 | Gansner | G06T 11/206 345/440 |
| 2003/0220940 | A1 * | 11/2003 | Futoransky et al. | 707/104.1 |
| 2005/0192930 | A1 * | 9/2005 | Hightower et al. | 707/1 |
| 2006/0168013 | A1 * | 7/2006 | Wilson | G05B 19/4184 709/206 |
| 2007/0174482 | A1 * | 7/2007 | Yajima | 709/238 |
| 2008/0255973 | A1 * | 10/2008 | El Wade | G06Q 30/06 705/35 |
| 2009/0100370 | A1 | 4/2009 | Martone et al. | |
| 2013/0055058 | A1 * | 2/2013 | Leong et al. | 715/219 |

OTHER PUBLICATIONS

AdWords Updates Reporting Options, Pitstop Media, By Steve Published on: Sep. 3, 2010.*
Visualizing your busiest PPC time periods using pivot tables & Excel, Datadial, by Adam, Aug. 22nd, 2011.*
Matlab Scatter pie plot Stack Overflow, Jun 17, 2012, p. 4.*

* cited by examiner

*Primary Examiner* — Barry Drennan
*Assistant Examiner* — Jason Pringle-Parker
(74) *Attorney, Agent, or Firm* — Jetter & Associates, P.A.

(57) ABSTRACT

A method of charting event occurrence counts includes processing event occurrence data recorded during operation of an industrial process to generate a chart having chart entries representing occurrence counts and chart positioning information. The chart positioning information includes an x-axis with a first time interval between x-positions and a y-axis with a second time interval between y-positions. Respective ones of the chart entries are positioned at intersections between the x-positions and y-positions by placing an element at the intersections having first feature attribute which indicates a relative magnitude of its event count. Time division count sums are computed to indicate a relative magnitude of a count sum across the x-positions and y-positions. The time division count sums are represented with a second feature attribute. The time division count sums are positioned for the x-positions adjacent to the second ending time and for the y-positions adjacent to the first ending time.

12 Claims, 2 Drawing Sheets

CHART LAYOUT WHICH HIGHLIGHTS EVENT OCCURRENCE PATTERNS

FIELD

Disclosed embodiments relate to data-processing of event occurrence data recorded during operation of an industrial process into data for displaying on charts for review by individuals associated with the process.

BACKGROUND

Most industrial processes and systems usually include sensors and alarm systems in which measured signals are monitored. Such industrial processes and systems can include, for example, conventional and nuclear power plants, pulp and paper plants, petroleum refineries, chemical and bio-chemical plants, and so forth. Examples of other industrial processes or systems include, for example, aerospace facilities, aircraft cockpits, medical intensive care units, and various government and military command locations. In these processes or systems, a large number of automated alarms are typically utilized, which are established to monitor one or more measured values, and are used to activate a warning signal if the value(s) goes beyond at least one limit, typically outside an alarm interval defined by a lower alarm limit and an upper alarm limit.

Identifying periodic patterns during events occurring over a period of time (e.g., days, weeks or months) can be useful for identifying actions that can improve manufacturing process efficiency and safety, especially when the events are process alarms. For this purpose, an alarm and event viewer may be provided in a table arrangement for the user (e.g., operator) to view. The table arrangement in such conventional alarm and event viewers is a row-by-row account of alarm and event activity, which are essentially text-based lists with each entry including a date, time and event identification (ID). A user (e.g., an operator) must read and decode the text-based information in each row to try identify event occurrence patterns, making it difficult to identify, for instance, event occurrence patterns having hourly or daily periods.

SUMMARY

This Summary is provided to introduce a brief selection of disclosed concepts in a simplified form that are further described below in the Detailed Description including the drawings provided. This Summary is not intended to limit the claimed subject matter's scope.

Disclosed embodiments include charts for viewing event occurrence counts and methods of displaying event occurrence counts using such charts. The charts have layouts that facilitate viewing patterns of event occurrence counts that makes periodic patterns (e.g., hourly or daily) readily apparent to individuals through visual inspection.

Event data recorded during operation of an industrial process over a period of time is processed to generate chart entries representing occurrence counts and chart position information. The chart position information includes an x-axis with a first time interval between the x-positions and a second time interval different from the first time interval between the y-positions. The chart entries are positioned at intersections between the x-positions and y-positions, and an element is positioned at the intersections having a first feature attribute which indicates a relative magnitude of its event count.

Time division count sums are computed to indicate a relative magnitude of a count sum across the x-positions and across the y-positions. This layout feature facilitates viewing patterns of event occurrence counts that makes periodic patterns (e.g., hourly or daily) readily apparent to individuals through visual inspection. In contrast, as described above, conventional alarm viewers use a table arrangement to present a row-by-row account of alarm and event activity as text-based lists with each entry including a date, time and event ID, where a user must read and decode the time information within each row, making it difficult to identify patterns, such as with hourly or daily periods.

DETAILED DESCRIPTION

Figure 1:
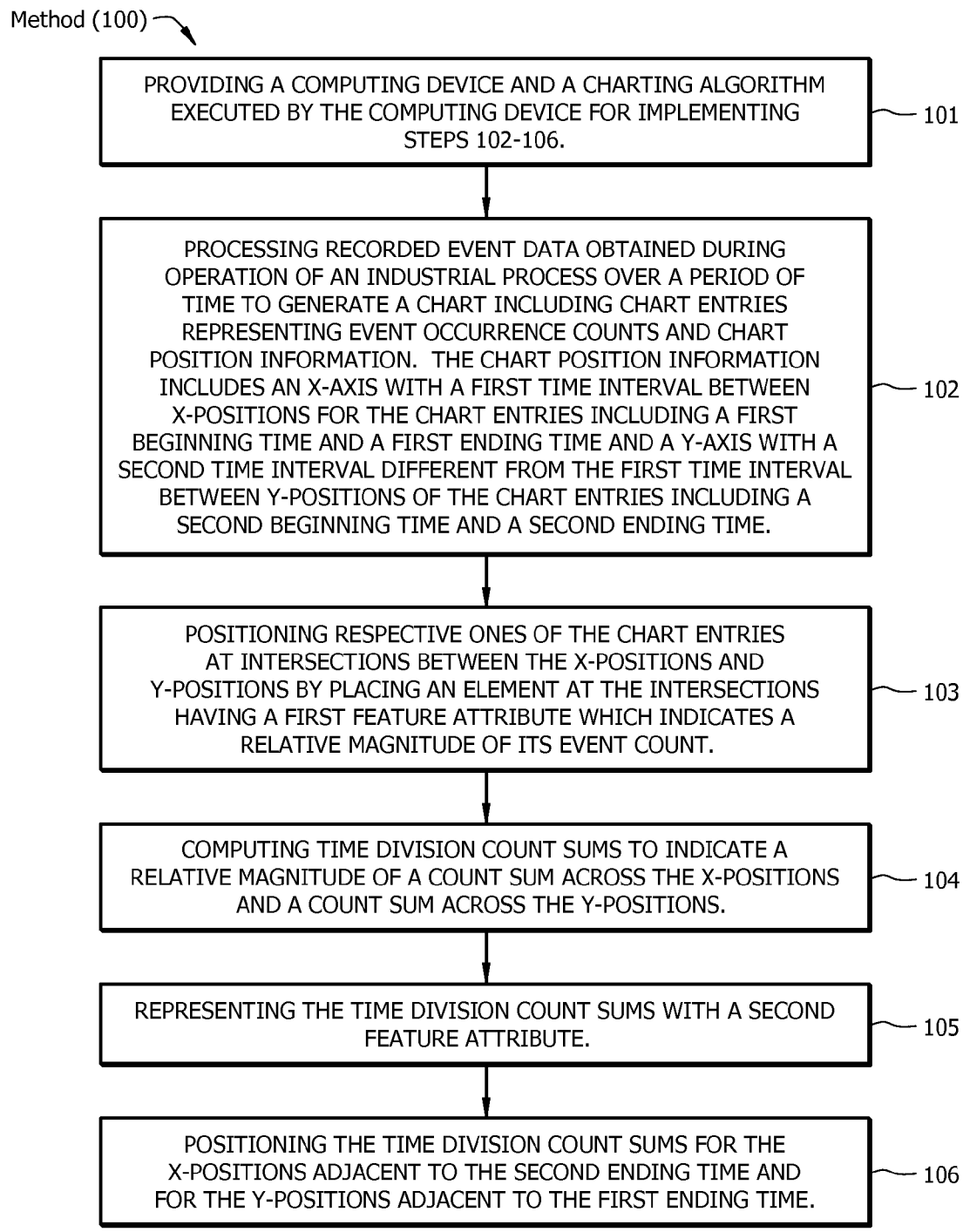
FIG. 1 is a flow chart that shows steps in an example method of displaying event occurrence counts with a chart having layout features which highlight event occurrence patterns, according to an example embodiment.

Disclosed embodiments are described with reference to the attached figures, wherein like reference numerals are used throughout the figures to designate similar or equivalent elements. The figures are not drawn to scale and they are provided merely to illustrate certain disclosed aspects. Several disclosed aspects are described below with reference to example applications for illustration. It should be understood that numerous specific details, relationships, and methods are set forth to provide a full understanding of the disclosed embodiments.

One having ordinary skill in the relevant art, however, will readily recognize that the subject matter disclosed herein can be practiced without one or more of the specific details or with other methods. In other instances, well-known structures or operations are not shown in detail to avoid obscuring certain aspects. This Disclosure is not limited by the illustrated ordering of acts or events, as some acts may occur in different orders and/or concurrently with other acts or events. Furthermore, not all illustrated acts or events are required to implement a methodology in accordance with the embodiments disclosed herein.

FIG. 1 is a flow chart that shows steps in an example method 100 of charting event occurrence counts with a chart having layouts highlighting event occurrence patterns. In one embodiment the event data is alarm data. Other examples of event data include operator' actions, work accidents, shutdowns, spills, flaring events, equipment failures, releases to the environment, and tank swings (for pipelines).

Step 101 comprises providing a computing device and a charting algorithm executed by the computing device implementing steps 102-106. Step 102 comprises processing recorded event data obtained during operation of an industrial process over a period of time to generate chart entries representing occurrence counts and chart position information. The event data can be obtained automatically from sensors or by manual (an individual's) entries. The chart position information includes an x-axis with a first time interval between x-positions for the chart entries including a first beginning time and a first ending time, and a y-axis with a second time interval different from the first time interval between y-positions of the chart entries including a second beginning time and a second ending time.

Step 103 comprises positioning respective ones of the chart entries at intersections between the x-positions and y-positions by placing an element at the intersections having a first feature attribute which indicates a relative magnitude of its event count. Step 104 comprises computing time division count sums to indicate a relative magnitude of a count sum across the x-positions and a count sum across the y-positions. Step 105 comprises representing the time division count sums with a second feature attribute. Step 106 comprises positioning the time division count sums for the x-positions adjacent to the second ending time and for the y-positions adjacent to the first ending time. The method generally further comprises displaying the chart on a display screen, such as a screen within the control room of a plant, or on the manufacturing floor of the plant.

Figure 2:
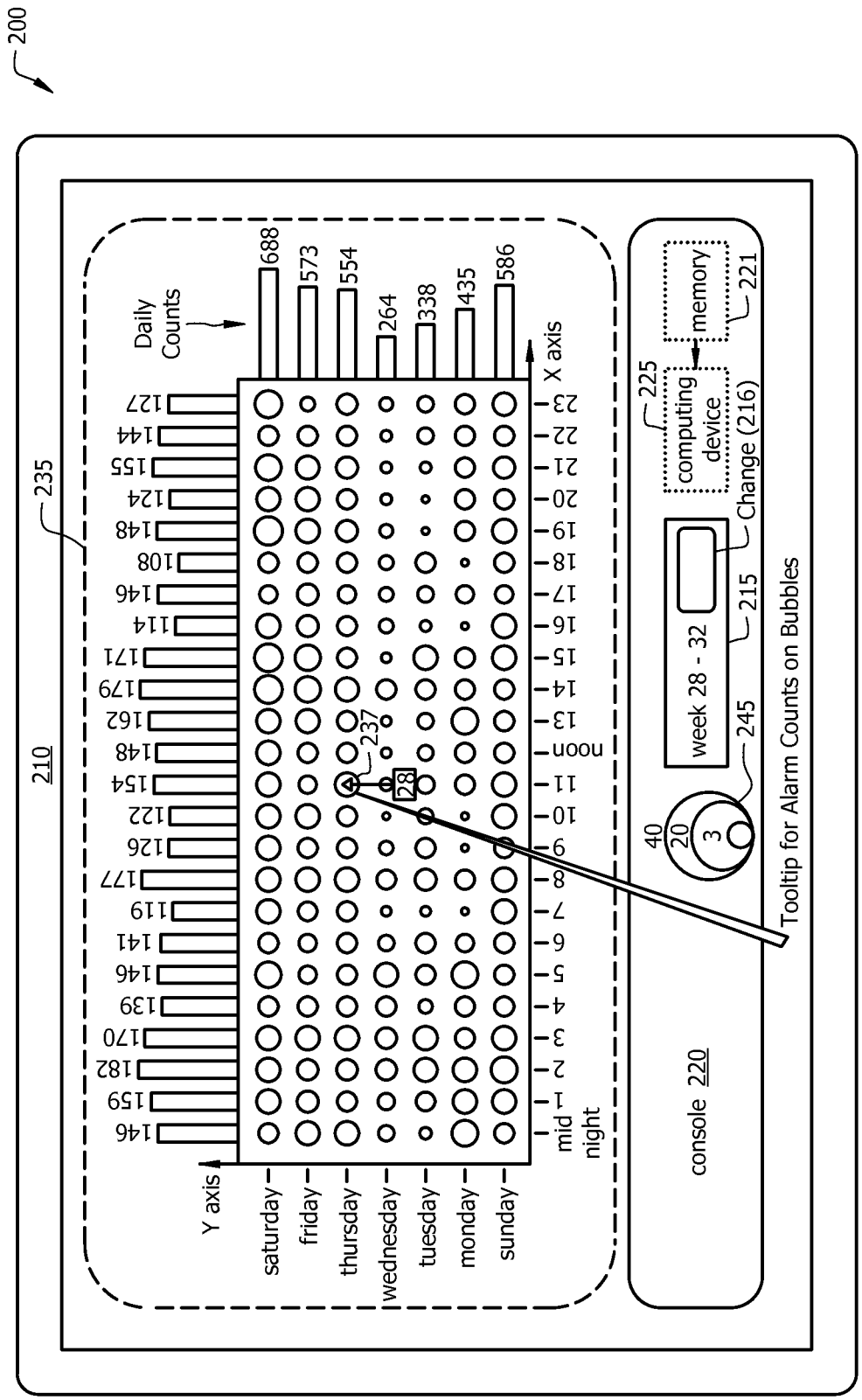
FIG. 2 is an example console display including a console and a display device shown as a screen displaying an example chart of event occurrence counts having a layout that highlights event occurrence patterns, according to an example embodiment.

FIG. 2 is an example console display 200 having a console 220 and a display device shown as a screen 210 showing a chart 235 of event occurrence counts having a layout that highlights event occurrence patterns, from event data recorded during operation of an industrial process, according to an example embodiment. The console 220 includes a computing device 225 (e.g., digital signal processor (DSP)) and an associated memory 221 that stores a disclosed charting algorithm executed by the computing device 225. The chart 235 is generally displayed on the screen 210 and is customized by actions initiated by a process operator within the control room of a plant or on the manufacturing floor, or by a technician, engineer or manager, such as by utilizing the time range control feature 215 provided on the console 220 to set some multiple of the larger time scale for the chart 235.

The chart 235 includes chart positioning information including an x-axis shown with the hours in a day (midnight (0), 1, 2, ... 23) so that time interval between x-positions is 1 hour, with the beginning time being midnight and the ending time 23 hrs (11 pm), and a y-axis with a second time interval different from the first time interval being days (each day spanning 24 hours) between y-positions including a beginning day of Sunday and an ending day of Saturday. The hours on the y-axis and the days of the week on the x-axis may be considered time buckets (as they "hold" event occurrence date) in addition to being time ranges. The time period represented by the entire set of data displayed in the chart 235 need not be explicitly called out on any of the chart axes, but is shown in FIG. 2 using a time range control feature 215 having a time period display portion, that being a five (5) week period as an example.

The chart entries can be seen to be positioned at intersections between the x-positions and y-positions, with the chart entries being elements shown as bubble elements at the intersections having the bubble size as the feature attribute which indicates a relative magnitude of its event count. For example, the bubble element 237 at the intersection of Thursday and 11 am is shown having an event count of 28 that can be displaced upon a user's cursor passing there over. A bubble legend 245 is shown on the console 220 which provides some sample bubble size-to-event count conversions.

The bubble elements 237 vary in area with changes in the value being represented, so their diameter varies as the square root of the display value. This aspect is standard in bubble charts. A typical working system display system auto scales the bubble sizes to the data set to avoid, or at least minimize, overlaps between the largest bubbles.

The time division count sums that indicate a relative magnitude of a count sum across the x-positions and count sums across the y-positions are shown with histograms in the form of rectangular bars and columns as the feature attribute. Bars are positioned for the x-positions adjacent to the ending time of Saturday (Saturday shown as 688 events) and columns for the y-positions adjacent to the ending time 23 hours (23 hours shown as 127 events). The histograms in the form of bars and columns make it possible, for instance, to quickly identify that the day with the lowest alarm count overall in chart 235 is Wednesday, and that the hour with the highest alarm count in a day in chart 235 is 2 am. As described above, the user is shown given the ability to set the overall time range shown in the chart by using the "time range control" feature 215 with a change button 216 provided on the console 220 shown in some multiple of the larger time scale, here an example 5 week aggregated range (week 28 to week 32) for the larger time scale being 1 week.

The "time range control" feature 215 showing "week 28-32" with change button 216 is one arrangement for controlling the display of the total time range of the data in the chart 235. The time range increment of the selection made using the time range control feature 215 is sized to be at least the size of the largest summed range, which as shown in chart 235 is a week, or some integer multiple of same, such as the 5 weeks shown in FIG. 2.

A plurality of different information can be identified by an individual viewing the chart 235. Hourly alarm counts seem to decline just before shift changes (here for an example 12-hour work shifts per day changing at 6 am and 6 pm). Wednesdays have the lowest daily alarm count. Saturdays and Sundays have the highest counts. This may be explained by the workers with the most seniority having the most flexibility in shift assignment, tending to avoid weekend shifts wherever possible.

Chart 235 can allow several preliminary conclusions to be reached with the above-described assumptions in place:

1. Work crews prefer things to be under control at shift handover, so as not to overload the incoming personnel.

2. It takes until the middle of the work week (e.g. Wednesday) to get the alarm counts to a manageable level.

3. The least experienced personnel have the most trouble with the alarm counts.

Seeing the above-described patterns and deriving these preliminary conclusions would be very difficult or not possible using standard alarm viewers, which are essentially text-based multi-line lists.

There are a variety of alternative embodiments possible. Regarding visualizations, other visualization methods are possible for any of the elements of the chart 235. For instance, the bubble elements can provide two functions by encoding count magnitude by size as described above and also simultaneously encoding the distribution (e.g. count for each week) through internal subdivision such as pie-chart type slices. In this embodiment the bubble elements 237 can shrink and grow as usual according to their aggregate (count) value and at the same time the pie "slices" show the weekly distribution within. The column and bar chart elements could then show a rolled-up distribution through stacked-bar elements.

Time scales, and time handling may also be changed. Examples of other time ranges for combination include one day/shifts, one shift/hours, one week/days, one year/quarters, one year/months, and one hour/minutes.

Rather than aggregating the count data over whole multiples of the larger time scale (e.g. 5 weeks as shown in FIG. 2), the chart could play back the count data (such as per week) through animation at a speed many times greater than the real-time speed. During playback, the bubble elements 237 can grow and shrink in size according to the data for that bubble position according to the time series information being presented at that particularly time. This embodiment creates a filmic experience that can help the viewer quickly see the progression of the count distribution over a period of time.

Disclosed embodiments recognize periodic patterns in events can be useful for improving manufacturing process efficiency and safety, especially when those events are process alarms. For instance, alarm counts can change by the hour and the day on account of differences in the skill of operational personnel, changes in the manufacturing process or other causes. Once identified by an individual, facilitated by disclosed charts, these patterns can be used to suggest beneficial changes in scheduling, staffing, and process control. However, as described above, event data can be non-alarm data including operator' actions, work accidents, shutdowns, spills, flaring events, equipment failures, releases to the environment, and tank swings (for pipelines), and such event data when charted as disclosed herein can be used for identifying actions that improve manufacturing process efficiency and safety.

While various disclosed embodiments have been described above, it should be understood that they have been presented by way of example only, and not limitation. Numerous changes to the subject matter disclosed herein can be made in accordance with this Disclosure without departing from the spirit or scope of this Disclosure. In addition, while a particular feature may have been disclosed with respect to only one of several implementations, such feature may be combined with one or more other features of the other implementations as may be desired and advantageous for any given or particular application.

As will be appreciated by one skilled in the art, the subject matter disclosed herein may be embodied as a system, method or computer program product. Accordingly, this Disclosure can take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, this Disclosure may take the form of a computer program product embodied in any tangible medium of expression having computer usable program code embodied in the medium.

Any combination of one or more computer usable or computer readable medium(s) may be utilized. The computer-usable or computer-readable medium may be, for example, but not limited to, an electronic, magnetic, optical, electromagnetic, infrared, or semiconductor system, apparatus, or device. More specific examples (a non-exhaustive list) of the computer-readable medium would include non-transitory media including the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CDROM), an optical storage device, or a magnetic storage device.

The invention claimed is:

1. A method of charting event occurrence counts, comprising:
   providing a computing device and a charting algorithm executed by said computing device implementing:
      processing event occurrence data recorded during operation of an industrial process including alarm data obtained from sensors in said industrial process over a period of time to generate a chart having chart entries representing occurrence counts and chart positioning information; wherein said chart positioning information includes an x-axis with a first time interval between x-positions including a first beginning time and a first ending time and a y-axis with a second time interval different from said first time interval between y-positions including a second beginning time and a second ending time;
      positioning respective ones of said chart entries at intersections between said x-positions and said y-positions by placing a bubble-shaped element at said intersections having a physical size which indicates a relative magnitude of its event count;
      computing time division count sums to indicate a relative magnitude of a count sum across said x-positions and across said y-positions,
      representing said time division count sums with a physical size of a feature attribute different from said bubble-shaped element, and
      positioning said time division count sums for said x-positions adjacent to said second ending time and for said y-positions adjacent to said first ending time;
      wherein said physical size of said bubble-shaped elements is auto scaled to at least minimize overlaps between largest ones of said bubble-shaped elements, and
      wherein said bubble-shaped element has internal divisions that encode additional count sum information.

2. The method of claim 1, further comprising displaying said chart on a display screen, an individual recognizing a pattern from said chart on said display screen, and based on said pattern changing at least one of scheduling, staffing, and process control during operation of said industrial process.

3. The method of claim 1, wherein said internal divisions comprise pie-chart type slices.

4. The method of claim 1, wherein said first time interval is in hours and said second time interval is in days.

5. The method of claim 1, wherein said time division count sums comprise histograms in a form of bars or columns where a length of said bars or said columns represents a relative magnitude of said time division count sums.

6. The method of claim 1, wherein said event occurrence data comprises at least one of operator' actions, work accidents, shutdown, spills, flaring events, equipment failures, environmental releases and tank swings for pipelines.

7. The method of claim 1, wherein said period of time is user selectable, further comprising a user changing said period of time for at least one of said first time interval and said second time interval.

8. Machine readable storage for charting event occurrence counts, comprising:
   a non-transitory machine readable storage medium having a charting algorithm code stored therein, said code executed by a computing device implementing:
      code for processing event occurrence data recorded during operation of an industrial process including alarm data from sensors in said industrial process over a period of time to generate a chart having chart entries representing occurrence counts and chart positioning information; wherein said chart positioning information includes an x-axis with a first time interval between x-positions including a first beginning time and a first ending time and a y-axis with a second time interval different from said first time interval between y-positions including a second beginning time and a second ending time;
      code for positioning respective ones of said chart entries at intersections between said x-positions and said y-positions by placing a bubble-shaped element at said intersections having a physical size which indicates a relative magnitude of its event count;

code for auto scaling said physical size of said bubble-shaped elements to at least minimize overlaps between largest ones of said bubble-shaped elements;

code for computing time division count sums to indicate a relative magnitude of a count sum across said x-positions and across said y-positions, code for representing said time division count sums with a physical size of a feature attribute different from said bubble-shaped element, and code for positioning said time division count sums for said x-positions adjacent to said second ending time and for said y-positions adjacent to said first ending time, and code for adding internal divisions to said bubble-shaped element that encode additional count sum information.

9. The machine readable storage of claim 8, wherein said internal divisions comprise pie-chart type slices.

10. The machine readable storage of claim 8, wherein said first time interval is in hours and said second time interval is in days.

11. The machine readable storage of claim 8, wherein said time division count sums comprise histograms in a form of bars or columns where a length of said bars or said columns represents a relative magnitude of said time division count sums.

12. The machine readable storage of claim 8, further comprising code enabling said period of time to be user selectable, and for a user to change said period of time for at least one of said first time interval and said second time interval.

* * * * *